United States Patent
Duarte et al.

(10) Patent No.: US 7,512,514 B2
(45) Date of Patent: Mar. 31, 2009

(54) ACCURATE ON-DIE TEMPERATURE MEASUREMENT USING REMOTE SENSING

(75) Inventors: David Duarte, Portland, OR (US);
George Geannopoulos, Portland, OR (US); Usman Mughal, Hillsboro, OR (US); Venkatesh Prasanna, Folsom, CA (US); Kedar Mangrulkar, Folsom, CA (US); Mathew Nazareth, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 81 days.

(21) Appl. No.: 11/540,002

(22) Filed: Sep. 29, 2006

(65) Prior Publication Data

US 2008/0082282 A1  Apr. 3, 2008

(51) Int. Cl.
*H01L 35/00* (2006.01)
(52) U.S. Cl. .................. 702/130; 702/131; 702/132; 374/141; 374/166; 713/320; 713/321; 713/322; 713/323

(58) Field of Classification Search ......... 702/130–132; 374/141, 166; 713/320–323
See application file for complete search history.

(56) References Cited

U.S. PATENT DOCUMENTS

| 6,908,227 B2 * | 6/2005 | Rusu et al. .......... 374/141 |
| 2008/0001647 A1 * | 1/2008 | Moore ............... 357/512 |

OTHER PUBLICATIONS

B.D. Moore "Tradeoffs in Selecting IC Temperature Sensors." Jun. 3, 1999, Microprocessors and Microsystems 23, pp. 181-184.*

* cited by examiner

*Primary Examiner*—Tung S Lau
*Assistant Examiner*—Sujoy K Kundu
(74) *Attorney, Agent, or Firm*—Blakely, Sokoloff, Taylor & Zafman LLP

(57) ABSTRACT

An embodiment of the present invention is a technique for thermal sensing. A sensing structure generates a response according to a local temperature at a first location on a die. A sensor core coupled to the sensing structure via routing lines to provide a measurement of the local temperature from the response. The sensor core is located at a second location remote to the first location and is powered by an analog supply voltage source located in a vicinity of the second location.

44 Claims, 10 Drawing Sheets

ACCURATE ON-DIE TEMPERATURE MEASUREMENT USING REMOTE SENSING

BACKGROUND

1. Field of the Invention

Embodiments of the invention relate to the field of semiconductor, and more specifically, to thermal sensing.

2. Description of Related Art

Thermal design in semiconductor devices has many challenging problems. It is desirable to sense hot areas in a semiconductor die so that appropriate actions may be taken to prevent damages or performance degradation to the die or the system.

Existing techniques for thermal sensing have a number of drawbacks. A common technique is to place a thermal sensor as close as possible to the most active unit or area in the semiconductor die. This technique requires real estate on the die to accommodate the thermal sensing circuit and the availability of a low-noise analog power supply. If the sensor is not located close enough to the actual hot spot, inaccurate thermal sensing may result. In addition, if an analog supply is not available in the vicinity of the sensing circuit, a digital supply has to be used. Using a digital supply may lead to further sensing errors because the digital supply tends to be noisy and may not be accurate due to temperature and process variations. Existing techniques therefore may not adequately provide thermal sensing at multiple locations because of the above problems. Furthermore, the problem of self-heating error introduced during a high volume manufacturing (HVM) trimming has not been adequately addressed.

BRIEF DESCRIPTION OF THE DRAWINGS

Embodiments of invention may best be understood by referring to the following description and accompanying drawings that are used to illustrate embodiments of the invention. In the drawings.

DESCRIPTION

Figure 1:
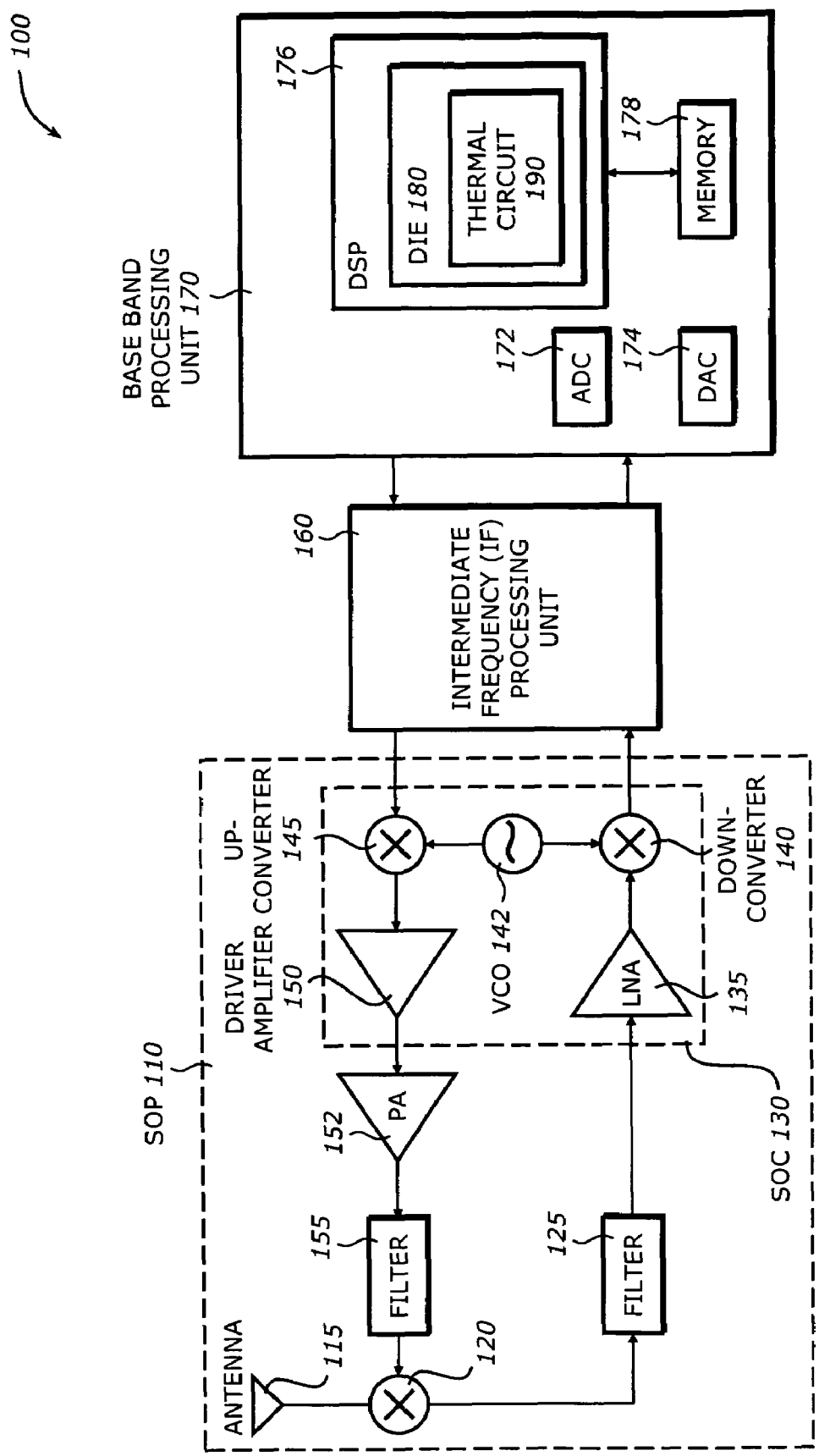
FIG. 1 is a diagram illustrating a system in which one embodiment of the invention may be practiced.

An embodiment of the present invention is a technique for on-die thermal sensing. A sensing structure generates a response according to a local temperature at a first location on a die. A sensor core is coupled to the sensing structure via routing lines to provide a measurement of the local temperature from the response. The sensor core is located at a second location remote to the first location and is powered by an analog supply voltage source located in a vicinity of the second location.

In the following description, numerous specific details are set forth. However, it is understood that embodiments of the invention may be practiced without these specific details. In other instances, well-known circuits, structures, and techniques have not been shown to avoid obscuring the understanding of this description.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

An embodiment of the present invention is a technique to accurately measure temperature on-die. The technique includes separating a sensing structure from a sensor core, placing the sensing structure at a location on a die where temperature measurement is desired, and placing the sensor core at a remote location with respect to the sensing structure at a location where an analog power supply is available. The technique provides an on-die accurate measurement of temperature because the sensing structure may be placed very close to the desired location due to its small area and the sensor core is powered by an analog power supply which is much less noisy than a digital power supply. In addition, multiple sensing structures may be placed at various locations on the die thanks to the small area occupied by the sensing structures.

To reduce the noise or voltage drop due to the distance between the sensing structure and the sensor core, the routing lines between them may be shielded with appropriate shielding techniques. In addition, the routing lines may be widened to reduce the voltage drop. Common grounding scheme is employed to reduce the voltage offset between the ground contacts in the sensing structure and the sensor core. Two grounding schemes may be used: local grounding and remote grounding. A leakage reduction circuit may be used in the sensing structure to reduce leakage caused by non-active sensing structures that are not correctly disabled. A self-trim procedure may be performed during a manufacturing or calibration phase by a self-trim state machine (STSM) which detects a trim code that causes a tripping signal to be generated. This self-trim procedure helps eliminating trim errors introduced in the presence of self-heating conditions.

FIG. 1 is a diagram illustrating a system 100 in which one embodiment of the invention may be practiced. The system 100 represents a mobile communication module. It includes a system on package (SOP) 110, an intermediate frequency (IF) processing unit 160, and a base-band processing unit 170.

The SOP 110 represents the front end processing unit for the mobile communication module. It is a transceiver incorporating on-package integrated lumped passive components as well as radio frequency (RF) components. It includes an antenna 115, a duplexer 120, a filter 125, a system-on-chip (SOC) 130, a power amplifier (PA) 152, and a filter 155.

The antenna 115 receives and transmits RF signals. The RF signals may be converted to digital data for processing in subsequent stages. It is designed in compact micro-strip and strip-line for L and C-band wireless applications. The duplexer 120 acts as a switch to couple to the antenna 115 to the receiver and the transmitter to the antenna 115. The filters 125 and 155 are C-band Low Temperature Co-Fired Ceramic (LTCC)-strip-line filter or multilayer organic lumped-element filter at 5.2 GHz and narrowband performance of 200 MHz suitable for the Institute of Electrical and Electronic Engineers (IEEE) 802.11 wireless local area network (WLAN). The SOC 130 includes a low noise amplifier (LNA) 135, a down converter 140, a local voltage controlled oscillator (VCO) 142, an up converter 145, and a driver amplifier 150. The LNA 135 amplifies the received signal. The down converter 140 is a mixer to convert the RF signal to the IF band to be processed by the IF processing unit 160. The up converter 145 is a mixer to convert the IF signal to the proper RF signal for transmission. The VCO 142 generates modulation signal at appropriate frequencies for down conversion and up conversion. The driver amplifier 150 drives the PA 152. The PA 152 amplifies the transmit signal for transmission.

The IF processing unit 160 includes analog components to process IF signals for receiving and transmission. It may include a band-pass filter and a low pass filter at suitable frequency bands. The filter may provide base-band signal to the base-band processing unit 170.

The base-band processing unit 170 may include an analog-to-digital converter (ADC) 172, a digital-to-analog converter (DAC) 174, a digital signal processor (DSP) 176, and a memory 178. The ADC 172 and the DAC 174 are used to convert analog signals to digital data and digital data to analog signal, respectively. The DSP 176 is a programmable processor that may execute a program to process the digital data. The DSP 176 may be coupled to the front end processing unit via the IF processing unit 160 and/or the base-band processing unit 170 to process the digital data. The DSP 176 may include a die 180 having a thermal circuit 190. The thermal circuit 190 provides a highly, non-invasive thermal sensing with support for a very precise thermal sensor trimming.

The memory 178 may stores program code and data for the DSP 176. The memory 178 is typically implemented with dynamic random access memory (DRAM), static random access memory (SRAM), or any other types of memories including those that do not need to be refreshed. The memory 178 may include multiple channels of memory devices such as DRAMs. The DRAMs may be Synchronous DRAM (SDRAM), Single Data Rate (SDR) SDRAM, Extended Data Out (EDO) DRAM, Double Data Rate (DDR) SDRAM, Double Data Rate Two (DDR2) SDRAM, Rambus DRAM (RDRAM R), Extreme Data Rate (XDR), or XDR II. RDRAM and XDR are registered trademarks of Rambus. The DDR doubles transfer rates by transferring data on both the rising and falling edges of the clock and may be packaged in a Dual In Line Memory Module (DIMM). This effectively doubles the transfer rate without increasing the frequency of the front side bus (FSB). The DDR2 increases the data rates using various techniques such as on-die termination to eliminate excess signal noise on the chip, pre-fetch buffers, and off-chip drivers. The off-chip drivers may use calibration techniques to calibrate the differential data strobes against each other. Through the calibration, the ramping voltages are optimized for the buffer impedances to reduce over- and under-shooting at the rising and falling edges. The XDR or XDR II uses Differential Rambus Signaling Levels (DRSL) for scalable high speed point-to-point bidirectional data signals and Rambus Signaling Level (RSL) for source synchronous bussed address and command signals to multiple deices. The memory devices used in the memory 178 may operate at any suitable clock frequency, such as 100 MHz, 133 MHz, 166 MHz, 266 MHz, 333 MHz, 400 Mhz, 1 GHz, or scalable to 8 GHz. They may be packaged in any packaging technologies including Ball Grid Array (BGA), DIMM, sticks or modules.

The thermal circuit 190 may be used in any other applications that may require thermal sensing and/or measurements. For example, it may be used on a microprocessor system having a microrocessor, chipsets, a memory, mass storage subsystems, a display, and input/output devices (e.g., keyboard, mouse).

Figure 2:
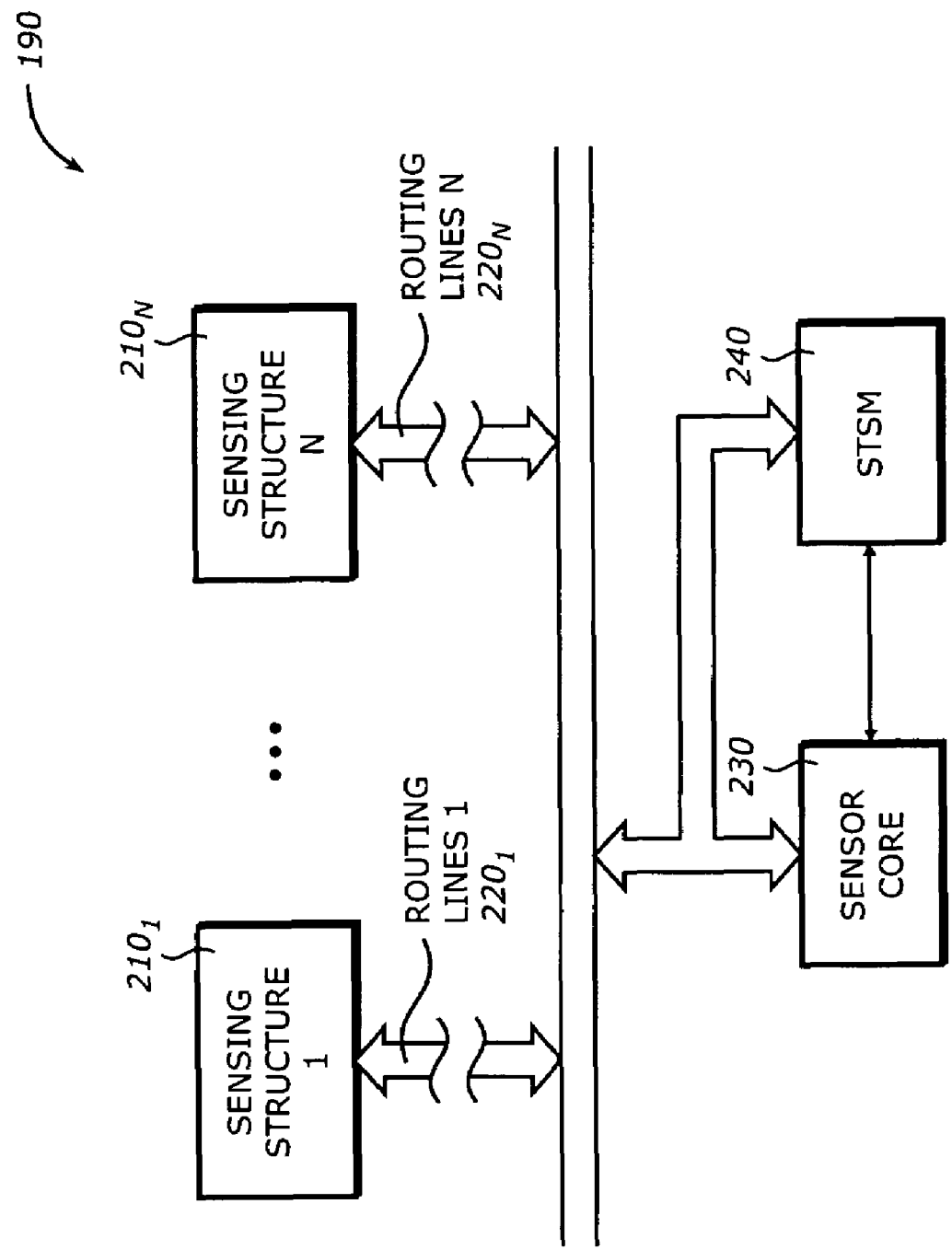
FIG. 2 is a diagram illustrating a thermal circuit according to one embodiment of the invention.

FIG. 2 is a diagram illustrating the thermal circuit 190 shown in FIG. 1 according to one embodiment of the invention. The thermal circuit 190 includes a number of sensing structures $210_1$ to $210_N$ where N is any positive integer including 1, a sensor core 230, and a self-trim state machine (STSM) 240. It is contemplated that the thermal circuit 190 may contain more or less than the above components.

The sensing structures $210_1$ to $210_N$ may be located at various locations on the die 180. Typically, these locations are the active areas that may generate the most heat when the die 180 is operating. Each of the sensing structures $210_1$ to $210_N$ generates a response according to a local temperature at its location on the die 180. In the following, sometimes the label 210 without a subscript is used to indicate one of the sensing structures $210_1$ to $210_N$.

The sensor core 230 is coupled to the sensing structures $210_1$ to $210_N$ via routing lines $220_1$ to $220_N$, respectively, to provide a measurement of the local temperature from the response of each of the sensing structures $210_1$ to $210_N$. The sensor core 230 may be located at a location remote to the locations of the sensing structures $210_1$ to $210_N$. It may be powered by an analog supply voltage source located in a vicinity of its location. The sensor core 230 may include circuits that process the response from the sensing structures $210_1$ to $210_N$. These circuits may include a current source circuit, a bias circuit, a reference voltage circuit, a trip generator circuit, or any other circuits that may be used in processing the response provided by the sensing structure 210. It is noted that there may be more than one sensor core 230 in the thermal circuit 190 to be connected to the sensing structures $210_1$ to $210_N$. Alternatively, the sensor core 230 may include a number of sensor circuits, each servicing one or more of the sensing structures $210_1$ to $210_N$.

To reduce the potential noise injection to the metal routing lines $220_1$ to $220_N$, adequate shielding may be added to the lines $220_1$ to $220_N$. In addition, to reduce the voltage drop along the lines $220_1$ to $220_N$, the lines $220_1$ to $220_N$ may be widened to reduce the resistance. Widening the lines $220_1$ to $220_N$ may introduce noise coupling, which in turn increases the shielding requirements. However, with careful planning, a good balance between shielding and widening may be achieved. Furthermore, as most thermal sensors are based on a band-gap loop, which uses a differential-sensing scheme, common mode noise may not be a major issue.

The STSM 240 is coupled to the sensing structures $210_1$ to $210_N$ and the sensor core 230 to perform self-trimming using a tripping signal from the sensor core 230. The STSM 240 collects the trim data during a self-trim procedure without interaction with the outside world while the digital global power supply is powered down. The self-trim procedure provides a mechanism to calibrate the sensor core 230 to compensate for process variations or any other self-induced errors such as self-heating errors. The trim data may then be retrieved or recovered when the digital power supply is enabled. The trim data may then be used to compensate for any self-heating induced error in the thermal circuit 190 caused by the leakage currents that flow, even in standby condition, through the millions of transistors stacks that make up die 180.

The separation of the sensing structures $210_1$ to $210_N$ from the sensor core 230 provides a number of benefits. First, each of the sensing structures $210_1$ to $210_N$ has a simple circuitry, involving mainly diodes and, in some cases, resistors. Therefore, the sensing structures $210_1$ to $210_N$ occupy only a small area, allowing them to be easily placed very close to the active, or hot, spot on the die, thus improving sensing accuracy. Second, the remote sensor core 230 may be placed at a location where an analog supply voltage source is readily available. This strategic placement leads to accurate measurements because it eliminates the need to use a local digital supply which may be noisy. Third, due to small area, multiple sensing structures may be placed at various locations on the die to provide quasi simultaneous temperature sensing. This may provide more comprehensive temperature measurements at desired locations to achieve many useful thermal management objectives such as tracking temperature variations or responses.

Because the sensor core 230 is located remotely with respect to the sensing structures $210_1$ to $210_N$, a non-negligible voltage offset between the local and remote ground contacts may exist. This voltage offset may be a result of the semiconductor characteristics of the substrate and the process variations during die fabrication. This voltage offset may also vary dynamically as the activity in various parts of the die 180 changes. One way to solve this problem is to use a common grounding reference for both the sensing structures $210_1$ to $210_N$ and the sensor core 230. There are two alternatives for such a common grounding reference. One is a local grounding scheme shown in FIG. 3A. One is a remote grounding scheme shown in FIG. 3B.

Figure 3A:
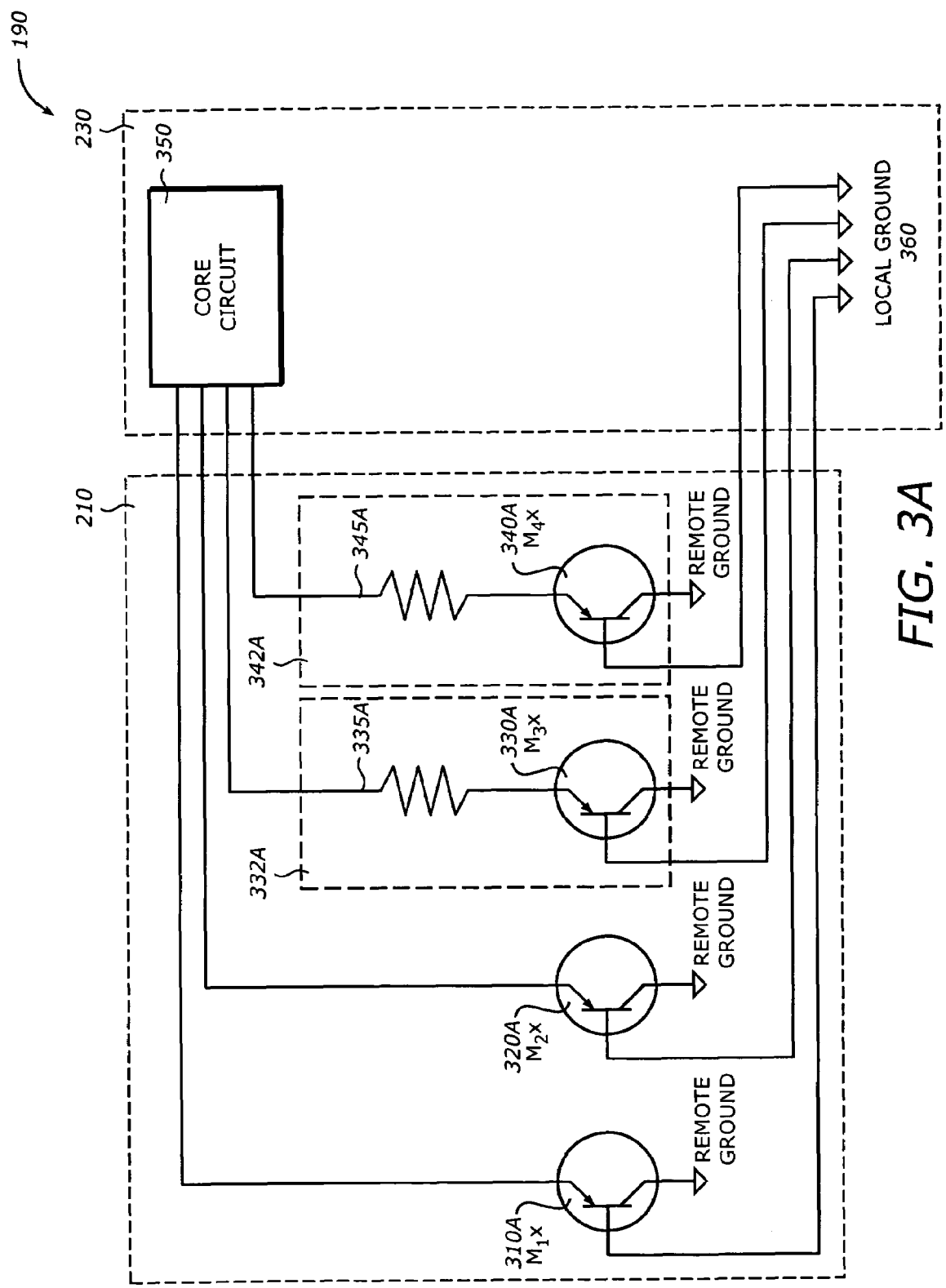
FIG. 3A is a diagram illustrating a sensing structure with local grounding according to one embodiment of the invention.

FIG. 3A is a diagram illustrating the sensing structure 210 shown in FIG. 2 with local grounding according to one embodiment of the invention. The sensing structure 210 may be any one of the sensing structures $210_1$ to $210_N$. It may include elements 310A, 320A, 330A, and 340A, and two resistors 335A and 345A. Each of the elements 310A, 320A, 330A, and 340A may be a semiconductor element, a switching element, or any other elements that may perform thermal sensing. There may be multiple copies of the elements depending on circuit configuration. The number of copies for each element is shown as $M_i x$ where $M_i$ is a positive integer. The element 330A and the resistor 335A may form a sensing circuit 332A. Similarly, the element 340A and the resistor 345A may form a sensing circuit 342A. Note that the sensing structure 210 may include more or less than the above components. The sensor core 230 may include a core circuit 350 and a local ground 360. The core circuit 350 includes a number of circuits to generate a temperature-indicating signal. These circuits may include a current source circuit, a bias circuit, a reference voltage circuit, a trip generator circuit, or any other circuits that may be used in processing the response provided by the sensing structure 210. The local ground 360 may be a ground contact or a ground plane used by the sensor core 230. Typically, the local ground 360 is an analog ground.

The elements 310A, 320A, 330A, and 340A are devices that operate like a diode. In one embodiment, the elements 310A, 320A, 330A, and 340A are implemented as PNP bipolar junction transistors. They exhibit forward voltages across the base-emmitter pn junction. The forward voltage across a pn junction varies approximately linearly and inversely in response to, or with respect to, the local temperature. The elements 310A and 320A may be used in a bias circuit in the core circuit 350. The elements 330A and 340A may be used to sense the local temperature at the location where they are located on the die. The voltages provided by the elements 330A and 340A may be used together with a reference voltage circuit and a current source circuit in the core circuit 350 to generate appropriate temperature-indicating signal. The temperature-indicating signal may be used by a trip generator circuit in the sensor core 220 to generate a tripping signal. The tripping signal indicates that the local temperature as snesed by the sensing structure 210 has exceeded a pre-set threshold.

In the illustrative example shown in FIG. 3A, the elements, or transistors, 310A, 320A, 330A, and 340A use a local grounding scheme. Each of the transistors 310A, 320A, 330A, and 340A has three terminals: an emitter terminal, a collector terminal, and a base terminal. The emitter terminals of the transistors 330A and 340A are connected to the resistors 335A and 345A, respectively. To implement a diode or a pn junction, the collector and base terminals are connected to ground. Each of the collector terminals of the transistors 310A, 320A, 330A, and 340A is connected to the local ground which is in the vicinity of the location of the sensing structure 210, which may be required unless a triple-well manufacturing process is available. As discussed above, the base terminals of these transistors are also connected to ground in order to implement a pn junction of a diode type. For local grounding scheme, the base terminals of the transistors 310A, 320A, 330A, and 340A are connected to the local ground 360 of the sensor core 230 to provide a return path to the currents.

Figure 3B:
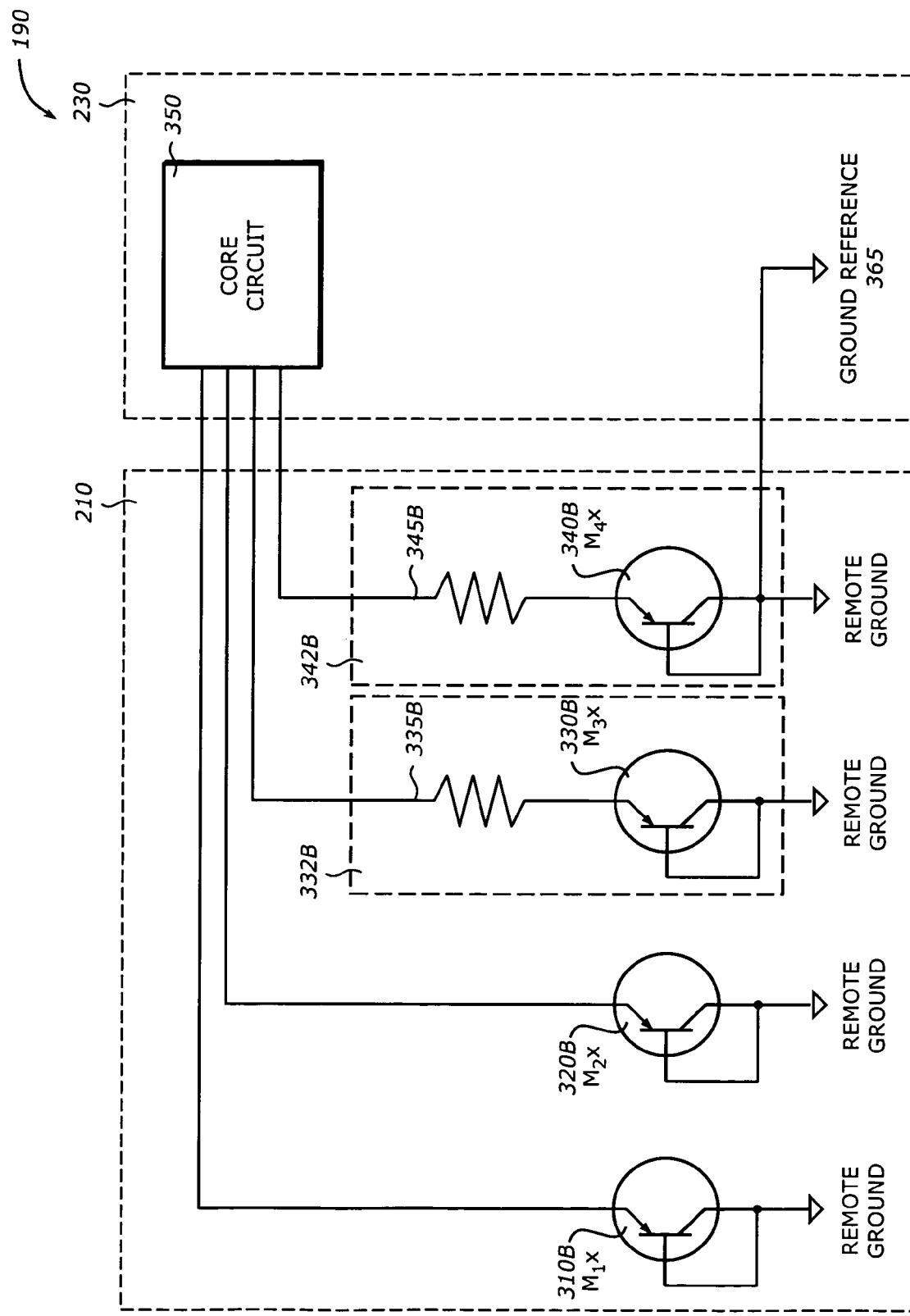
FIG. 3B is a diagram illustrating a sensing structure with remote grounding according to one embodiment of the invention.

FIG. 3B is a diagram illustrating the sensing structure 210 shown in FIG. 2 with remote grounding according to one embodiment of the invention. The sensing structure 210 essentially includes the same components as in FIG. 3A. It includes elements 310B and 320B, and sensing circuits 332B and 342B. The sensing circuit 332B includes an element 330B and a resistor 335B. The sensing circuit 342B includes a element 340B and a resistor 345B. Note that the sensing structure 210 may include more or less than the above elements.

In this remote grounding scheme, the base terminals of the transistors 310A, 320A, 330A, and 340A are connected to the corresponding collector terminals and to the ground at the location of the sensing structure 210. The transistor 340B serves as a sample. By making the effective ground reference 365 for the sensor core 230 remote, it may be required that some other circuits or structures in it be also referenced to the same remote ground. The ground reference 365 is for analog structures or circuits that are not to be placed remotely with the sensing structure 210. By bringing the ground connection at the sensing structure 210 back to the sensor core 230 for such circuits and structures, variations due to the above-mentioned voltage offset may be compensated. Note that only circuits or structures that are fundamental for correct trip indication may require access to the remote ground.

Figure 4:
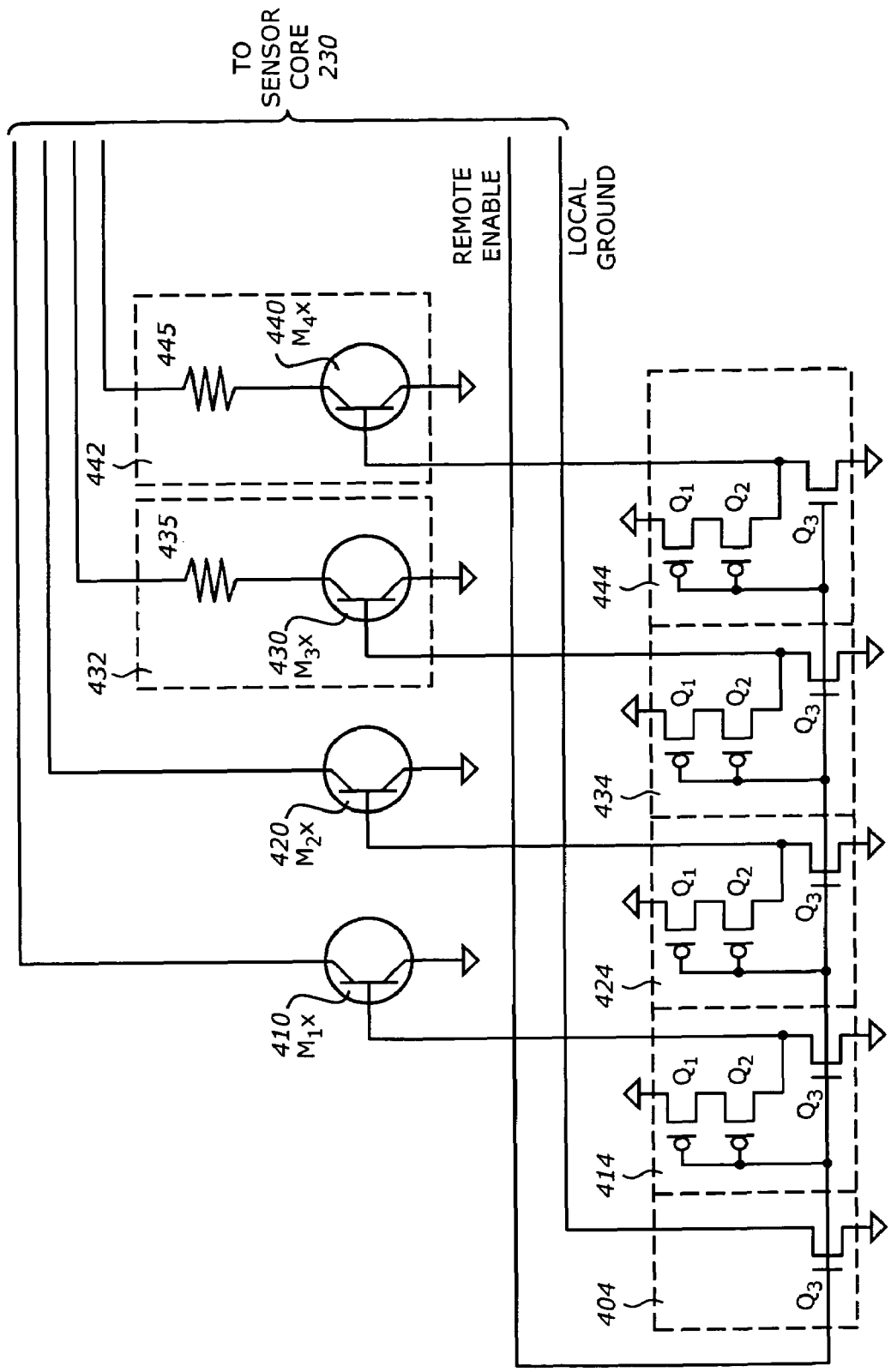
FIG. 4 is a diagram illustrating a sensing structure with leakage reduction according to one embodiment of the invention.

FIG. 4 is a diagram illustrating the sensing structure 210 shown in FIG. 2 with leakage reduction according to one embodiment of the invention. The sensing structure 210 with leakage reduction includes elements 410, 420, 430, and 440, and two resistors 435 and 445 similar to the elements 310A, 320A, 330A, and 340A, and two resistors 335A and 345A shown in FIG. 2A, respectively. In addition, the sensing structure 210 includes leakage reduction circuits 404, 414, 424, 434, and 444. The element 430 and resistor 435 forms a sensing circuit 432. The element 440 and resistor 445 forms a sensing circuit 442.

As discussed above, the elements 410, 420, 430, and 440, and two resistors 435 and 445 are similar to the elements 310A, 320A, 330A, and 340A, and two resistors 335A and 345A, respectively. In other words, the elements 410, 420, 430, and 440 may be a semiconductor element, a switching element, or any other elements that may perform thermal sensing. They may be implemented as transistors operating as pn junctions. The base terminals of the transistors 410, 420, 430, and 440 are connected to the leakage reduction circuits 414, 424, 434, and 444, respectively.

Leakage currents may result and flow through the non-active sensing structures that are not correctly disabled. Leakage currents may lead to measurement errors in the sensing structure 210. It is therefore desirable to reduce the leakage. The leakage reduction circuits 414, 424, 434, and 444 are similar. They are implemented with pull-up transistors. Each of the circuits 414, 424, 434, and 444 includes two PMOS transistors $Q_1$ and $Q_2$, and and NMOS transistor $Q_3$. For the circuit 404, $Q_3$ provides a ground path between the required structures in the sensor core 230 and the remote ground in the sensing circuit 210. The circuit 404 may be implemented similar to the circuits 414, 424, 434, or 444, if necessary. For the circuits 414, 424, 434, and 444, the terminal between the two pull-up transistors $Q_1$ and $Q_2$ and the ground path transistor $Q_3$ is connected to the base terminal of the corresponding switching element. All the transistors are enabled by a remote enable signal from the sensor core 230.

When the sensor core 230 de-asserts the enable signal, the pull-up transistors $Q_1$ and $Q_2$ are turned on to provide a path that ensures the reverse biasing of the base-emitter junction. The transistors $Q_1$, $Q_2$, and $Q_3$ are sized accordingly to allow for the above condition when the sensing structure is disabled and to provide sufficient current drive capability when the sensing structure is enabled.

Figure 5:
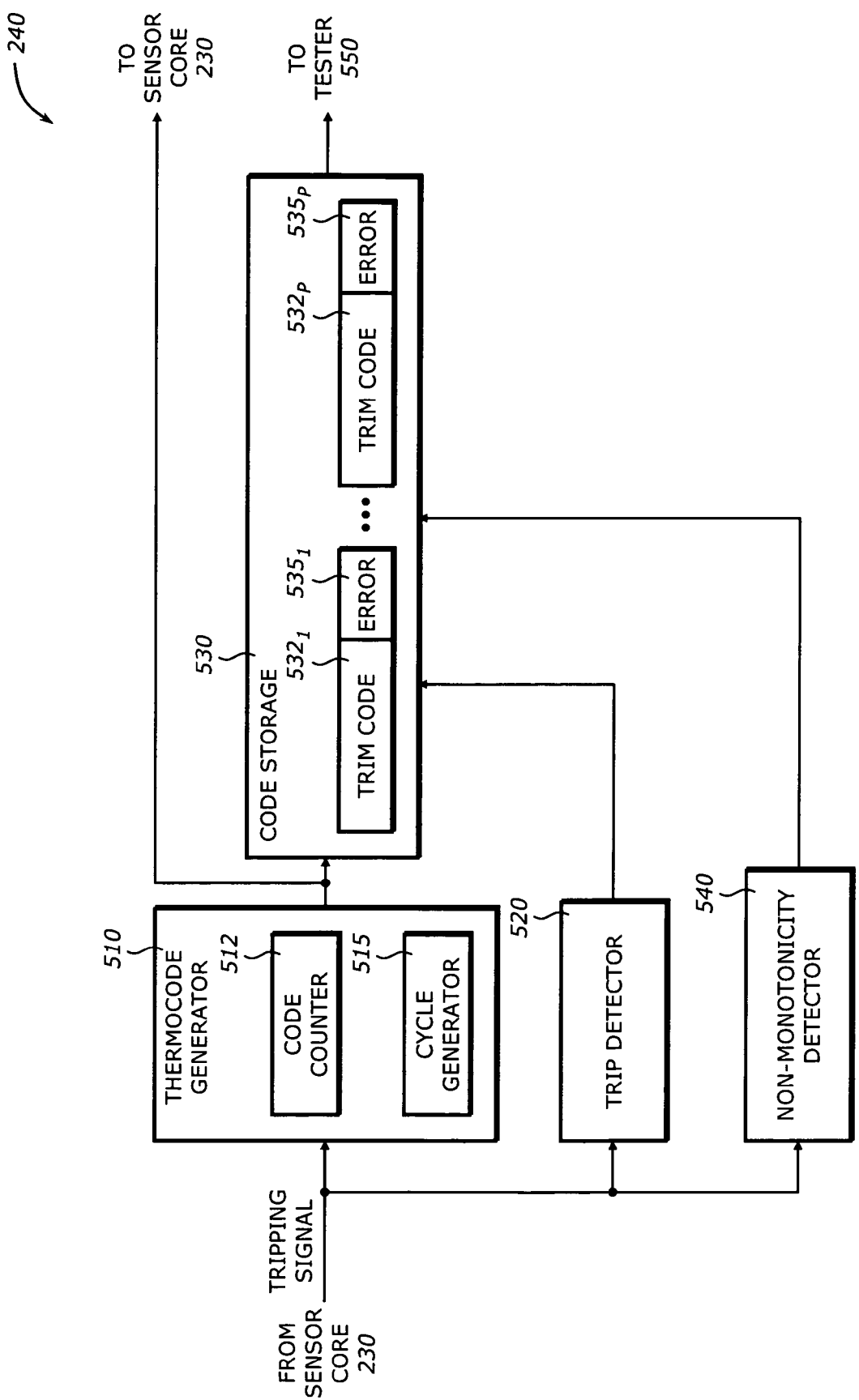
FIG. 5 is a diagram illustrating a self-trim state machine (STSM) according to one embodiment of the invention.

FIG. 5 is a diagram illustrating the STSM 240 shown in FIG. 2 according to one embodiment of the invention. The STSM 240 includes a thermometer code generator 510, a trip detector 520, a code storage 530, and a non-monotonicity detector 540.

The thermometer code generator 510 generates a plurality of trim codes to the sensor core 230 during a self-trim procedure when the analog supply voltage source is available and a digital supply voltage source is not available. The self-trim procedure may be performed automatically after the analog supply voltage ramps up in the absence of the digital supply voltage.

The thermometer code generator 510 includes a code counter 512 and a cycle generator 515. The code counter 512 generates all the available codes from a minimum value to a maximum value. For example, for a 7-bit code, the code counter 512 increments from 0 to 127. The cycle generator 515 generates a loop counter for K cycles. In one embodiment, a total of 16 cycles are used. For each cycle, the code counter 512 generates the trim codes from the minimum value to the maximum value. The trim codes are sent to the sensor core 230 to configure the current source circuit. Each of the bits in the trim codes may be used to selectively enable or disable a current source unit to achieve the desired voltage levels for the temperature-indicating signals provided by the sensing structure 210. The sensor core 230 receives the response from the sensing structure 210 and generates the tripping signal when this response exceeds a predetermined reference threshold provided by the reference voltage circuit in the sensor core 230.

The trip detector 520 detects a trim code in the plurality of trim codes that corresponds to the tripping signal. The trip detector 520 receives the tripping signal provided by the sensor core 230 and uses it to latch the trim code as provided by the code counter 512. In one embodiment, the trip detector 520 may be a simple logic gate such as an inverter to invert the tripping signal to clock a register.

It may be desirable to store P of detected trim codes for the last P of the K cycles to perform basic error correction. Accordingly, the code storage 530 may be implemented as a register or a bank of P registers connected in cascade. At each cycle, the detected trim code clocked or latched in the register by the trip detector 520 may be transferred to the code storage 530. At the end of the K cycles, the P registers contain the last P detected trim codes. The code storage 530 includes first storage elements $532_1$ to $532_P$ to store the detected trim codes in the last P cycles and second storage elements $535_1$ to $535_P$ to store the last P non-monotonicity errors provided by the non-monotonicity detector 540.

The non-monotonicity detector 540 detects the non-monotonicity error. It may be implemented as a D flip-flop clocked by the tripping signal. The detected non-monoticity error may be transferred to the second storage $535_i$ (i=1, ..., P) in the code storage 530. In one embodiment, this error is a one-bit error and is appended to the detected trim code. For an L-bit trim code, the total size of the code storage 530 is P(L+1). For example, if L=7 and P=3, the total size of the code is 24-bit.

The contents of the code storage 530 may be sent to a tester 550. The tester 550 may be a circuit that reads the code storage 530 and decides on a final L-bit trim code from the P L-bit trim codes. For example, the tester 550 may take the average value, the median value, the lowest value, or the highest value of the P trim codes, or any other value selected or computed from of the P trim codes. The tester 550 may then burn the selected trim code into the fuse field of the thermal circuit 190.

Figure 6:
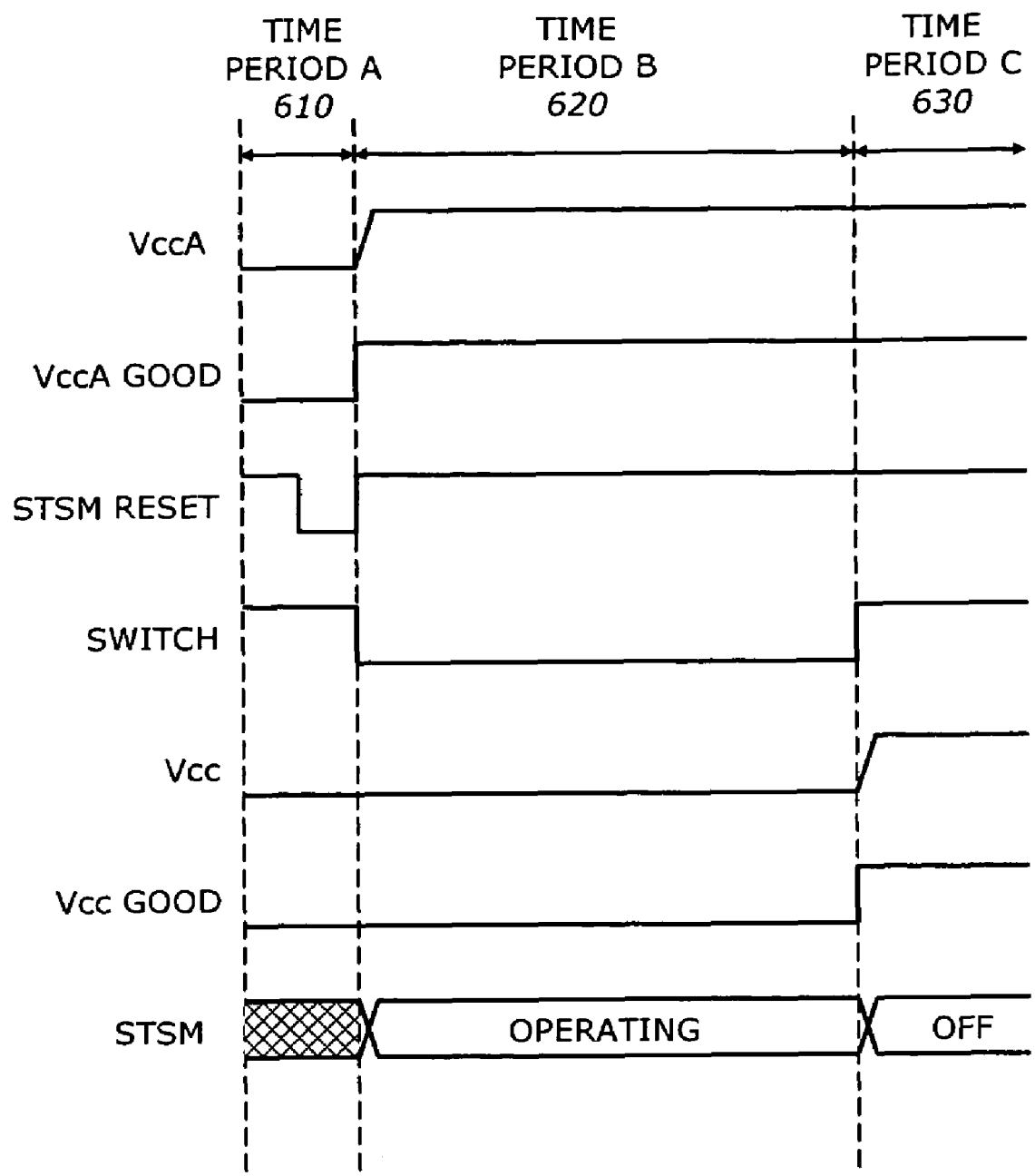
FIG. 6 is a timing diagram illustrating operation of the STSM according to one embodiment of the invention.

FIG. 6 is a timing diagram illustrating operation of the STSM according to one embodiment of the invention. The timing diagram shows the signals VCCA, VCCA GOOD, STSM RESET, SWITCH, VCC, VCC GOOD, and STSM, and the time periods 610, 620, and 630. The time period 610 corresponds to the initial analog power up period. The time period 620 corresponds to the period during which the STSM is operating. The time period 630 corresponds to the digital power up period.

The VCCA signal is the analog power supply voltage. During the time period 610, VCCA is low. It then ramps up to full power level during the time periods 620 and 630. The VCCA GOOD signal is an indicator that indicates when the VCCA signal is available. It is low during the period 610 indicating that the VCCA is not available. It is high during the periods 620 and 630 to indicate that the VCCA is available and at full power level. The STSM RESET signal is used to reset the STSM. It is a low pulse during the period 610 and high during the periods 620 and 630. The SWITCH signal is used to indicate the window or time period during which the STSM is operating. It is high during the periods 610 and 630 to indicate non-operating STSM and is low during the period 620 to indicate operating STSM. The VCC signal is the digital power supply voltage. During the time periods 610 and 620, it is low indicating that it is not available or powered down. During the time period 630, the VCC is at full power. The VCC GOOD signal is an indicator that indicates when the VCC signal is available. It is low during the periods 610 and 620 indicating that the VCC is not available. It is high during the period 630 to indicate that the VCC is available and at full power level. The STSM signal shows the operational status of the STSM. It is undetermined during the period 610 and is reset during the low pulse of the STSM RESET signal. It is operational during the 620 period indicating that the STSM is running. It is off during the time period 630 indicating that the STSM stops running or is not operating.

Figure 7:
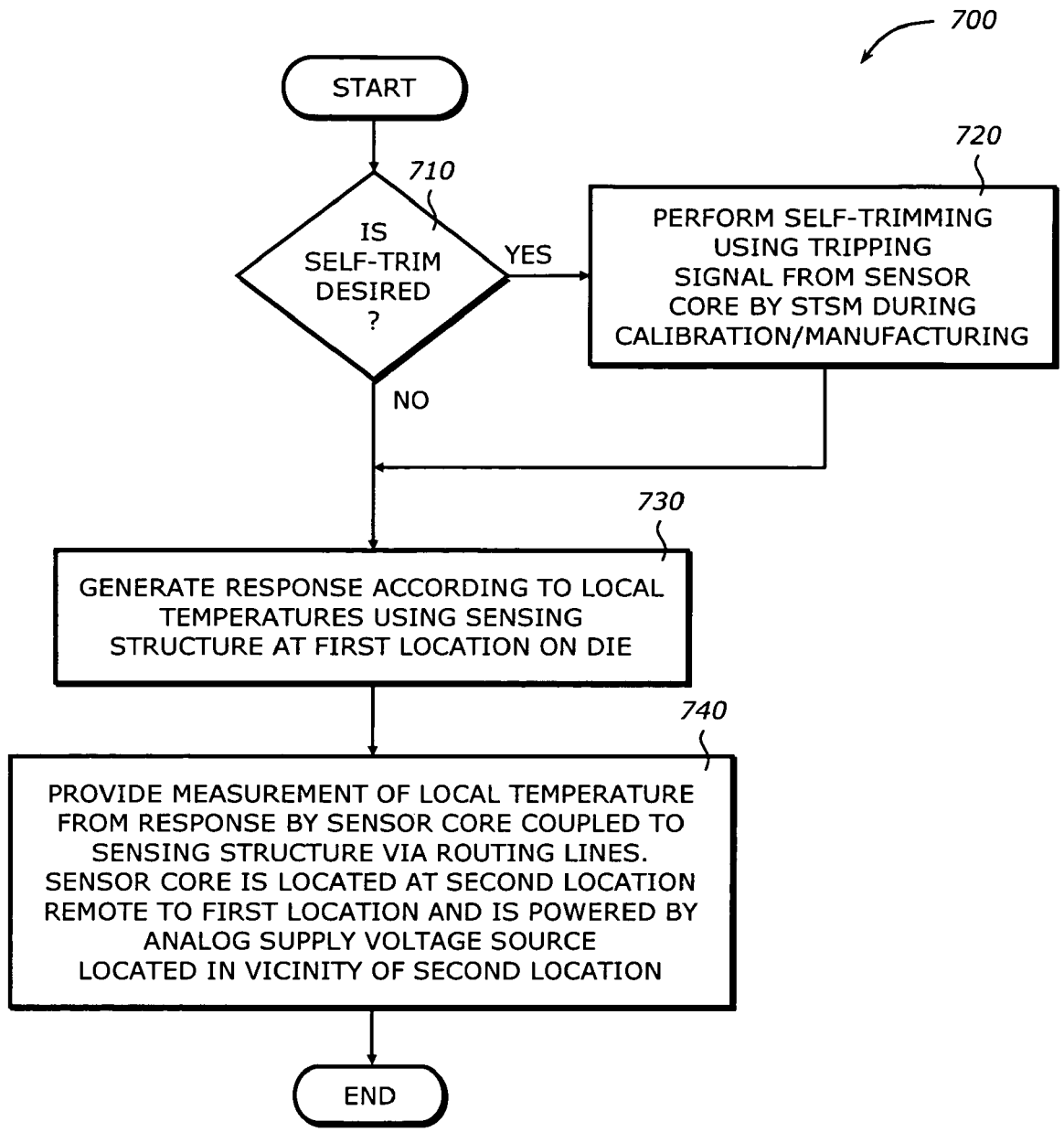
FIG. 7 is a flowchart illustrating a process for thermal sensing according to one embodiment of the invention.

FIG. 7 is a flowchart illustrating a process 700 for thermal sensing according to one embodiment of the invention.

Upon START, the process 700 determines if it is desired to perform self-trimming (Block 710). If not, the process proceeds to block 730 when the circuit is operating in the field. Otherwise, the process 700 performs a self-trimming using a tripping signal from the sensor core by a self-trim state machine during a self-trim procedure. Typically, the self-trim procedure is one of the last phases during manufacturing before the parts are shipped or during a calibration phase. The process 700 then proceeds to block 730.

Next, the process 700 generates a response according to a local temperature using a sensing structure at a first location on a die (Block 730). This operation is performed when the circuit is operational in the field. Typically the first location corresponds to the location where temperature measurement is desired. It is usually the active, or hot, area on the die.

Next, the process 700 provides a measurement of the local temperature from the response by a sensor core coupled to the sensing structure via routing lines (Block 740). The sensor core is located at a second location remote to the first location and is powered by an analog supply voltage source located in a vicinity of the second location. The process 700 is then terminated.

Figure 8:
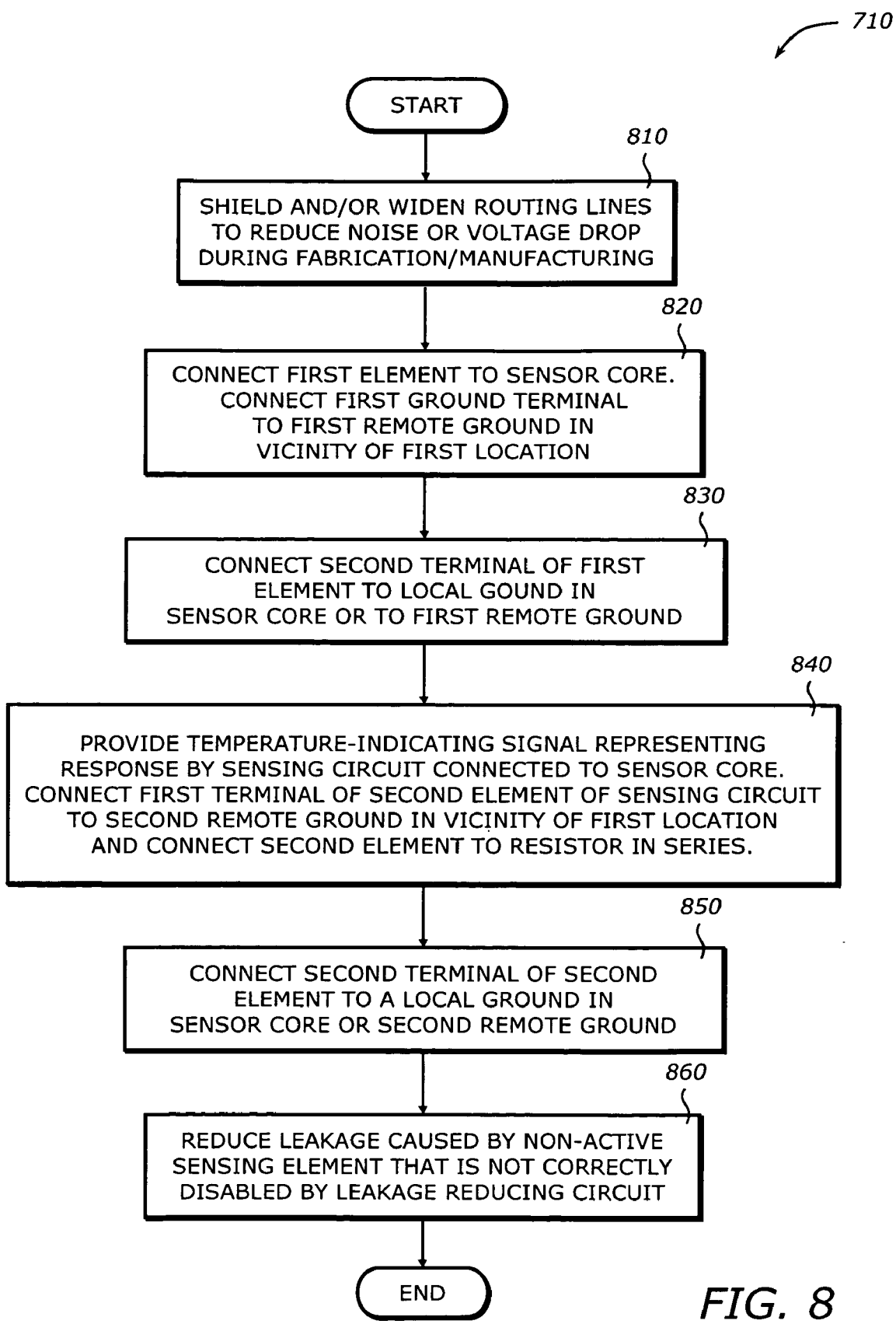
FIG. 8 is a flowchart illustrating a process to generate a response using sensing structure according to one embodiment of the invention.

FIG. 8 is a flowchart illustrating the process 710 shown in FIG. 7 to generate a response using sensing structure according to one embodiment of the invention.

Upon START, the process 710 shields and/or widens the routing lines to reduce noise or voltage drop (Block 810). Typically, this operation is performed during fabrication or manufacturing phase. Next, the process 710 connects a first element to the sensor core (Block 820). The first element may be the transistor 310A, 320A, 310B, or 320B shown in FIGS. 3A and 3B. This may be performed by connecting a first terminal of the first element to a first remote ground in a vicinity of the first location. The first terminal may correspond to the collector terminal of the transistor 310A, 320A, 310B, or 320B. Then, the process 710 connects a second terminal of the first element to one of a local ground in the sensor core and the first remote ground (Block 830). The second terminal may correspond to the base terminal of the transistor 310A, 320A, 310B, or 320B.

Next, the process 710 provides a temperature-indicating signal representing the response by a sensing circuit connected to the sensor core (Block 840). This may be performed by connecting a first terminal of a second element of the sensing circuit to a second remote ground in the vicinity of the first location, and connecting the second element to a resistor in series. The second element may correspond to the transistor 330A, 340A, 330B, or 340B shown in FIGS. 3A and 3B. The first terminal may correspond to the collector terminal of the transistor 330A, 340A, 330B, or 340B.

Then, the process 710 connects a second terminal of the second element to one of a local ground in the sensor core and the second remote ground (Block 850). The second terminal may correspond to the base terminal of the transistor 330A, 340A, 330B, or 340B. Next, the process 710 reduces leakage caused by a non-active sensing element that is not correctly disabled by a leakage reducing circuit (Block 860). This may be performed by using the pull-up cascode transistors as shown in FIG. 4. The process 710 is then terminated.

Figure 9:
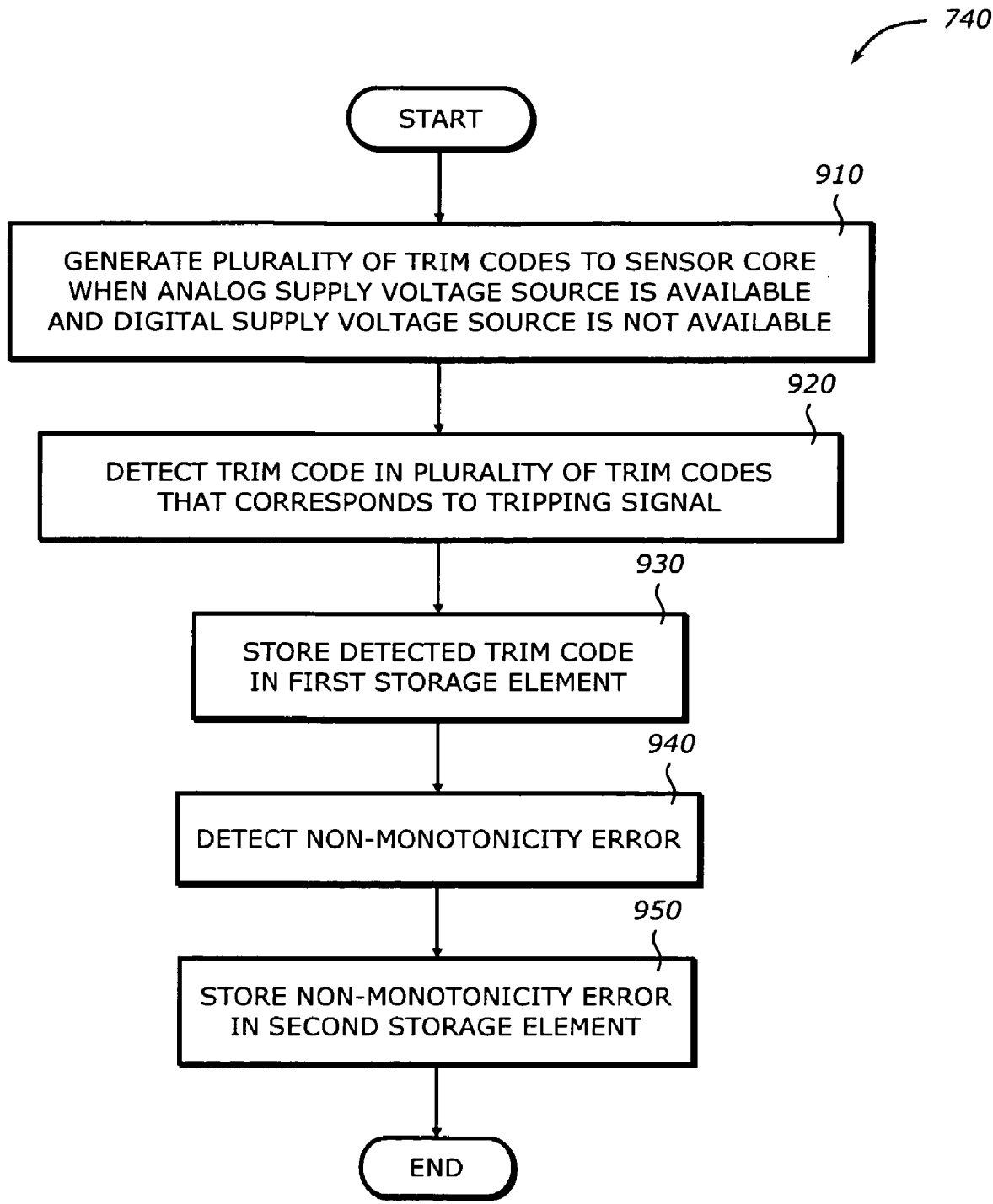
FIG. 9 is a flowchart illustrating a process to perform self-trimming according to one embodiment of the invention.

FIG. 9 is a flowchart illustrating the process 740 shown in FIG. 7 to perform self-trimming according to one embodiment of the invention.

Upon START, the process 740 generates a plurality of trim codes to the sensor core during a self-trim procedure when the analog supply voltage source is available and a digital supply voltage source is not available (Block 910). Next, the process 740 detects a trim code in the plurality of trim codes that corresponds to the tripping signal (Block 920). Then, the process 740 stores the detected trim code in a first storage element.

Next, the process 740 detects a non-monotonicity error (Block 940). Then, the process 740 stores the non-monotonicity error in a second storage element (Block 950) and is then terminated.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
a sensing structure to generate a response according to a local temperature at a first location on a die;
a sensor core coupled to the sensing structure via routing lines to provide a measurement of the local temperature from the response, the sensor core being located at a second location remote to the first location and being powered by an analog supply voltage source located in a vicinity of the second location; and
a self-trim state machine (STSM) coupled to the sensing structure and the sensor core to perform self-trimming using a tripping signal from the sensor core.

2. An apparatus comprising:
a sensing structure to generate a response according to a local temperature at a first location on a die; and
a sensor core coupled to the sensing structure via routing lines to provide a measurement of the local temperature from the response, the sensor core being located at a second location remote to the first location and being powered by an analog supply voltage source located in a vicinity of the second location;
wherein the routing lines are shielded or widened to reduce noise or voltage drop.

3. The apparatus of claim 1 wherein the sensing structure comprises:
a first element connected to the sensor core, the first element having a first terminal connected to a first remote ground in a vicinity of the first location.

4. The apparatus of claim 3 wherein the first element further comprises:
a second terminal connected to one of a local ground in the sensor core and the first remote ground.

5. The apparatus of claim 3 wherein the sensing structure further comprises:
a sensing circuit connected to the sensor core to provide a temperature-indicating signal representing the response, the sensing circuit including a resistor and a second element in series with the resistor, the second element having a first terminal connected to a second remote ground in the vicinity of the first location.

6. The apparatus of claim 5 wherein the second element comprises:
a second terminal connected to one of a local ground in the sensor core and the second remote ground.

7. An apparatus comprising:
a sensing structure to generate a response according to a local temperature at a first location on a die; and
a sensor core coupled to the sensing structure via routing lines to provide a measurement of the local temperature from the response, the sensor core being located at a second location remote to the first location and being powered by an analog supply voltage source located in a vicinity of the second location;
wherein the sensing structure comprises: a leakage reducing circuit to reduce leakage caused by a non-active sensing element that is not correctly disabled.

8. The apparatus of claim 1 wherein STSM comprises:
a thermometer code generator to generate a plurality of trim codes to the sensor core during a self-trim procedure when the analog supply voltage source is available and a digital supply voltage source is not available;
a trip detector to detect a trim code in the plurality of trim codes that corresponds to the tripping signal; and
a first storage element to store the detected trim code.

9. The apparatus of claim 8 wherein the STSM further comprises:
a non-monotonicity detector to detect non-monotonicity error; and
a second storage element to store the non-monotonicity error.

10. A method comprising:
generating a response according to a local temperature using a sensing structure at a first location on a die;
providing a measurement of the local temperature from the response by a sensor core coupled to the sensing structure via routing lines, the sensor core being located at a second location remote to the first location and being powered by an analog supply voltage source located in a vicinity of the second location; and
perform self-trimming using a tripping signal from the sensor core by a self-trim state machine (STSM).

11. A method comprising:
generating a response according to a local temperature using a sensing structure at a first location on a die; and
providing a measurement of the local temperature from the response by a sensor core coupled to the sensing structure via routing lines, the sensor core being located at a second location remote to the first location and being powered by an analog supply voltage source located in a vicinity of the second location;
wherein the routing lines are shielded or widened to reduce noise or voltage drop.

12. The method of claim 10 wherein generating the response comprises:
connecting a first element to the sensor core, comprising connecting a first terminal of the first element to a first remote ground in a vicinity of the first location.

13. The method of claim 12 wherein connecting the first element further comprises:
connecting a second terminal of the first element to one of a local ground in the sensor core and the first remote ground.

14. The method of claim 12 wherein generating the response further comprises:
providing a temperature-indicating signal representing the response by a sensing circuit connected to the sensor core, comprising:
connecting a first terminal of a second element of the sensing circuit to a second remote ground in the vicinity of the first location and,
connecting the second element to a resistor in series.

15. The method of claim 14 wherein providing the temperature-indicating signal further comprises:
connecting a second terminal of the second element to one of a local ground in the sensor core and the second remote ground.

16. A method comprising:
generating a response according to a local temperature using a sensing structure at a first location on a die; and
providing a measurement of the local temperature from the response by a sensor core coupled to the sensing structure via routing lines, the sensor core being located at a second location remote to the first location and being powered by an analog supply voltage source located in a vicinity of the second location;
wherein generating the response comprises: reducing leakage caused by a non-active sensing element that is not correctly disabled by a leakage reducing circuit.

17. The method of claim 10 wherein performing self-trimming comprises:
generating a plurality of trim codes to the sensor core during a self-trim procedure when the analog supply voltage source is available and a digital supply voltage source is not available;
detecting a trim code in the plurality of trim codes that corresponds to the tripping signal; and
storing the detected trim code in a first storage element.

18. The method of claim 17 wherein performing self trimming further comprises:
detecting non-monotonicity error; and
storing the non-monotonicity error in a second storage element.

19. A system comprising:
a front end processing unit to receive and transmit a radio frequency (RF) signal, the RF signal being converted to digital data; and
a digital signal processor (DSP) coupled to the front end processing unit to process the digital data, the DSP having a thermal circuit comprising:
a first sensing structure to generate a first response according to a first local temperature at a first location on a die of the DSP, and
a sensor core coupled to the first sensing structure via first routing lines to provide a measurement of the first local temperature from the first response, the sensor core being located at a second location remote to the first location and being powered by an analog supply voltage source located in a vicinity of the second location.

20. The system of claim 19 wherein the thermal circuit further comprises:
a self trim state machine (STSM) coupled to the first sensing structure and the sensor core to perform self-trimming using a tripping signal from the sensor core.

21. The system of claim 19 wherein the thermal circuit further comprises:
a second sensing structure coupled to the sensor core via second routing lines to generate a second response according to a second local temperature at a third location on the die; and wherein the sensor core provides a measurement of the second local temperature from the second response.

22. The system of claim 19 wherein the first sensing structure comprises:
a first element connected to the sensor core, the first element having a first terminal connected to a first remote ground in a vicinity of the first location.

23. The system of claim 22 wherein the first element further comprises:
a second terminal connected to one of a local ground in the sensor core and the first remote ground.

24. The system of claim 22 wherein the first sensing structure further comprises:
a sensing circuit connected to the sensor core to provide a temperature-indicating signal representing the response, the sensing circuit including a resistor and a second element in series with the resistor, the second element having a first terminal connected to a second remote ground in the vicinity of the first location.

25. The system of claim 24 wherein the second element comprises:
a second terminal connected to one of a local ground in the sensor core and the second remote ground.

26. The system of claim 19 wherein the first sensing structure comprises:
a leakage reducing circuit to reduce leakage caused by a non-active sensing element that is not correctly disabled.

27. The system of claim 20 wherein STSM comprises:
a thermometer code generator to generate a plurality of trim codes to the sensor core during a self-trim procedure when the analog supply voltage source is available and a digital supply voltage source is not available;
a trip detector to detect the trim code in the plurality of trim codes that corresponds to the tripping signal; and
a first storage element to store the detected trim code.

28. The system of claim 27 wherein the STSM further comprises:
a non-monotonicity detector to detect non-monotonicity error; and a second storage element to store the non-monotonicity error.

29. The apparatus of claim 2 wherein the sensing structure comprises:
a first element connected to the sensor core, the first element having a first terminal connected to a first remote ground in a vicinity of the first location.

30. The apparatus of claim 29 wherein the first element further comprises:
a second terminal connected to one of a local ground in the sensor core and the first remote ground.

31. The apparatus of claim 29 wherein the sensing structure further comprises:
a sensing circuit connected to the sensor core to provide a temperature-indicating signal representing the response, the sensing circuit including a resistor and a second element in series with the resistor, the second element having a first terminal connected to a second remote ground in the vicinity of the first location.

32. The apparatus of claim 31 wherein the second element comprises:
a second terminal connected to one of a local ground in the sensor core and the second remote ground.

33. The apparatus of claim 7 wherein the sensing structure comprises:
a first element connected to the sensor core, the first element having a first terminal connected to a first remote ground in a vicinity of the first location.

34. The apparatus of claim 33 wherein the first element further comprises:
a second terminal connected to one of a local ground in the sensor core and the first remote ground.

35. The apparatus of claim 33 wherein the sensing structure further comprises:
a sensing circuit connected to the sensor core to provide a temperature-indicating signal representing the response, the sensing circuit including a resistor and a second element in series with the resistor, the second element having a first terminal connected to a second remote ground in the vicinity of the first location.

36. The apparatus of claim 35 wherein the second element comprises:
a second terminal connected to one of a local ground in the sensor core and the second remote ground.

37. The method of claim 11 wherein generating the response comprises:
connecting a first element to the sensor core, comprising connecting a first terminal of the first element to a first remote ground in a vicinity of the first location.

38. The method of claim 37 wherein connecting the first element further comprises:
connecting a second terminal of the first element to one of a local ground in the sensor core and the first remote ground.

39. The method of claim 37 wherein generating the response further comprises:
providing a temperature-indicating signal representing the response by a sensing circuit connected to the sensor core, comprising:
connecting a first terminal of a second element of the sensing circuit to a second remote ground in the vicinity of the first location and,
connecting the second element to a resistor in series.

40. The method of claim 39 wherein providing the temperature-indicating signal further comprises:
connecting a second terminal of the second element to one of a local ground in the sensor core and the second remote ground.

41. The method of claim 16 wherein generating the response comprises:
connecting a first element to the sensor core, comprising connecting a first terminal of the first element to a first remote ground in a vicinity of the first location.

42. The method of claim 41 wherein connecting the first element further comprises:
connecting a second terminal of the first element to one of a local ground in the sensor core and the first remote ground.

43. The method of claim 41 wherein generating the response further comprises:
providing a temperature-indicating signal representing the response by a sensing circuit connected to the sensor core, comprising:
connecting a first terminal of a second element of the sensing circuit to a second remote ground in the vicinity of the first location and,
connecting the second element to a resistor in series.

44. The method of claim 43 wherein providing the temperature-indicating signal further comprises:
connecting a second terminal of the second element to one of a local ground in the sensor core and the second remote ground.

* * * * *